Nov. 28, 1939.　　　R. E. McILRATH　　　2,181,195
CARBON DIOXIDE CONVERTER

Filed July 22, 1938

Inventor
Roy E. McIlrath
BY
Parker, Carlson, Pitzner & Hubbard.

Attorneys.

Patented Nov. 28, 1939

2,181,195

UNITED STATES PATENT OFFICE 2,181,195

CARBON DIOXIDE CONVERTER

Roy E. McIlrath, Chicago, Ill.

Application July 22, 1938, Serial No. 220,661

2 Claims. (Cl. 62—91.5)

The invention relates to converters and more particularly to apparatus for converting solid carbon dioxide into gaseous form.

The present invention in general constitutes an improvement upon the apparatus disclosed in my copending application Serial No. 172,133 filed November 1, 1937, now matured into Patent No. 2,166,637, granted July 18, 1939. In this earlier filed application a carbon dioxide converter has been disclosed embodying a container adapted to receive solid carbon dioxide, which is converted into gaseous form, and a single blow-off cock located at a low point in the container. By so placing this blow-off cock, which is the sole means of relieving the pressure within the container, an opening of the cock to relieve the pressure automatically causes the residual gas within the container to scrub out the walls of the container and remove any foreign matter deposited therein. Such an arrangement is particularly useful in the event that the gaseous carbon dioxide derived from the converter is to be used in charging beverages because a small quantity of oil sometimes collects in the converter chamber and if it is not removed periodically it passes out of the chamber into the charged beverage and gives the latter an unpleasant taste. A blow-off cock arranged as described above should preferably be of such character that the operator of the converter can operate it by simply grasping it with his fingers as distinguished from using a wrench or similar contrivance. Such a digitally operable cock must control a very small port, however, in view of the high pressures which are built up in the converter. The oil, dirt or other foreign matter within the converter is likely to clog such a small port so that two antithetical requirements are presented. The general aim of the present invention is to solve this difficulty.

More particularly it is an object of the present invention to provide an improved form of carbon dioxide converter embodying a blow-off cock device so arranged that it can be digitally operated to relieve the pressure within the converter, and at the same time cause the escaping gas to exert a scrubbing action on the interior of the container, and also embodying an arrangement for cleaning and inspecting the interior in the blow-off cock device itself so that it will not become clogged during use.

Further objects and advantages of the invention will become apparent as the following description proceeds taken in connection with the accompanying drawing in it.

For convenience of illustration the invention has been shown and described herein as embodied in a converter for carbon dioxide and in which quantities of solid carbon dioxide are converted into gaseous form within the container and supplied to some point of use as, for example, in a beverage charging apparatus. It will be understood by those skilled in the art, however, that the present invention may in some respects be applicable to other types of converters and there is consequently no intention to limit the invention to the particular application shown. On the other hand, the appended claims are intended to cover all modifications and alternative constructions within the spirit and scope of the invention.

Figure 1:
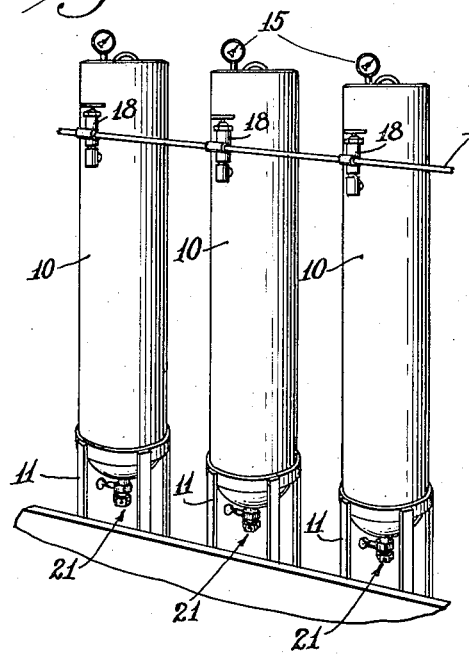
Figure 1 is a general perspective view of a multi-container carbon dioxide converter mechanism embodying the present invention.
Figure 2:
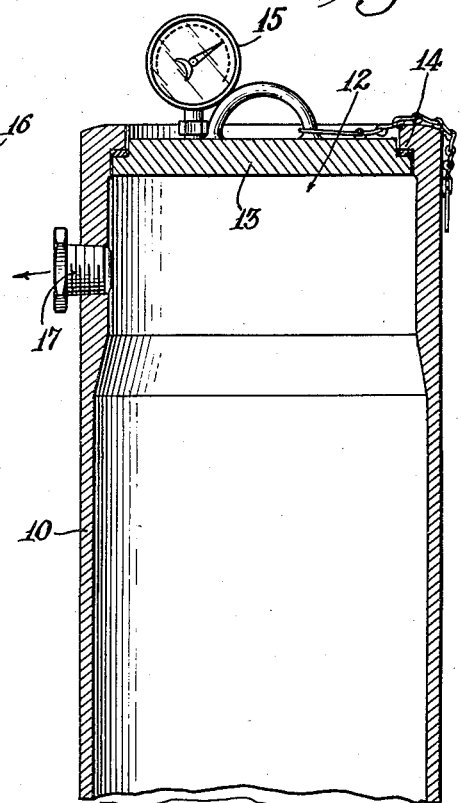
Fig. 2 is an enlarged longitudinal sectional view of one of the converter units included in the apparatus of Fig. 1.

Upon reference to Fig. 1 it will be seen that the particular converter apparatus disclosed includes a plurality of vertically arranged cylindrical container units 10 carried on supporting racks or frame works 11. Blocks of solid carbon dioxide are inserted in the containers 10 through large openings 12 (Fig. 2) in the upper ends thereof which expose the interiors of the containers to substantially their entire cross section. After the container has been loaded with the solid carbon dioxide a cover 13 is disposed across the opening 12, as shown in Fig. 2 with its peripheral edge portion abutting against a downwardly facing shoulder or flange 14 surrounding the opening of the container. Then, as the pressure within the container is increased, the cover 13 is pressed tightly against the shoulder 14, thereby forming an effective hermetic seal. The usual pressure guage 15 may be mounted on the cover 13.

In order to convert the carbon dioxide within the container 10 from its solid to its gaseous phase, the container is exposed to ordinary room temperatures for a period of several hours. The solid carbon dioxide thus absorbs heat from the air surrounding the container and changes into gaseous form building up a high pressure within the container. This pressure frequently reaches 1,000 pounds per square inch. The high pressure gas may then be drawn off through an outlet conduit 16 connected to a beverage charging apparatus or the like. Each of the containers 10 communicates with the high pressure line 16 through outlet nipples 17 and have shut-off valves 18. The amount of gas supplied from each container can be readily controlled by these shut-off valves 18.

Small quantities of lubricating oil and similar adulterants are sometimes mixed with the carbon dioxide during the process of its formation. This oil or the like condenses in the form of small globules as the solid carbon dioxide changes to gaseous form and may accumulate in the bottom of the converter container 10, finally being discharged with the gas passing therefrom after a period of time. In order to overcome this difficulty the container is preferably so fashioned that its interior walls slope to a single low point as indicated at 19 in Fig. 2. An aperture 20 is located at this point and in this aperture is inserted an improved form of blow-off cock device designated generally by the numeral 21. This blow-off cock device constitutes the sole means of finally relieving the pressure, within the container 10, to such a value that the cover 13 can be removed. Consequently, upon each refilling of the container the pressure therein is relieved by opening the blow-off cock device 21 and in this pressure relieving operation the gas flows rapidly across the inner walls of the container thereby exerting a scrubbing action on them and carrying any oil or other foreign matter into the blow-off cock device 21.

Figure 3:
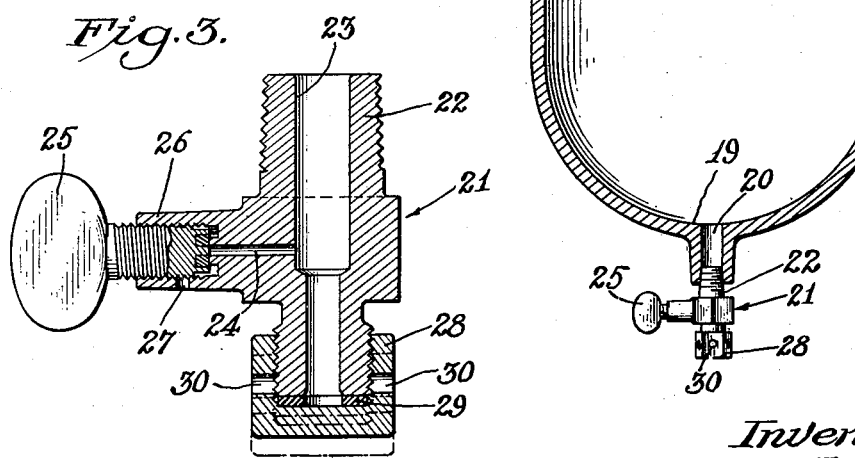
Fig. 3 is an enlarged vertical sectional view of a blow-off cock device, one of which is incorporated in each of the converter units.

In order to facilitate frequent operation of the blow-off cock device 21 it is provided with a valve member which can be operated by the operator's fingers as distinguished from the use of a wrench or the like. In the illustrative construction shown the device includes an elongated generally cylindrical valve body 22 which is threaded in the lower end of the aperture 20. An interiorly located bore 23 extends axially throughout the length of the valve body 22 being somewhat reduced in diameter at its lower end. A transverse bleeder port 24 communicates with the mid-portion of the bore 23. This port 24 is quite small in cross section so that it may be effectively closed by a digitally operable valve member 25 threaded in an extension 26 on the valve body 22. When the valve member 25 is in the position shown in Fig. 3 the small bleeder port 24 is effectively closed. Upon backing off the valve member 25, however, the port 24 is opened so that gas can escape from the interior of a container 10 through the bore 23, port 24 and finally to atmosphere through a port 27 in the side wall of the projection 26.

In the operation of one of the converter units described the container 10 is loaded with solid carbon dioxide which gradually changes into gaseous form in the manner previously noted. This gaseous carbon dioxide is withdrawn from the container through the line 16 until the pressure within the container falls to such a value that it is no longer sufficient for beverage charging or other purposes for which the gas is being used. In such case, however, the gas within the container 10 is still under considerable pressure and accordingly this pressure must be relieved before the cover 13 can be removed for refilling the container with fresh solid carbon dioxide. To so relieve the pressure the operator grasps the valve 25 with his fingers and backs it off until the high pressure gas within the container 10 can escape through the bleeder port 24. The escaping gas flows over the inner walls of the container and effectively scrubs them clean of any oil or other foreign matter which may have been deposited in the container. Most of this foreign matter flows out through the port 24 but larger or heavier particles collect in the lower end of the valve body bore 23. In the course of time this collection of larger particles becomes sufficient to clog up the port 24. It is impractical to make the port 24 of larger diameter since it must be very small if it is to be effectively retained closed by the digitally operable valve member when subjected to pressure as great as 1,000 pounds per square inch such as are encountered in such apparatus. This high pressure occurs while the valve is closed and during the conversion operation rather than at the time of valve opening or closing. When it does occur, however, the pressure per unit area tending to unseat the valve element is very high. By making the port 24 small the area of the valve element 25 contacted by high pressure gas is minimized, as is the total pressure applied to the valve element. Consequently, the valve element remains firmly seated even though tightened only by the operator's fingers.

To accommodate the blow-off cock device 21 for periodic cleaning it is provided with a valve member or cup shaped cap 28 threaded on the lower end of the valve body 22. This cap 28 is normally positioned as shown in full lines in Fig. 3 so that it presses tightly against a gasket 29 and hermetically seals the lower end of the bore 23. The cap 28 is preferably made in hexagonal shape so that it can be readily gripped by a wrench for tightening purposes. When the cap 28 is screwed off to the position shown in dot-dash lines in Fig. 3, a series of radially extending ports 30 in its side walls communicate with the lower end of the bore 23 so that the gas pressure can be relieved through them.

The cap 28 is more than simply a cover for a clean-out port. In fact, it constitutes a second or alternative bleeder valve for relieving pressure within the container 10 and acts to clean out the bore 23 in the blow-off cock device 21 automatically. In the normal operation of the converter the operator unscrews the cap 28 to relieve the pressure within the container about once a month and, of course, uses the finger operative valve 25 at all other times. On the occasions when the cap 28 is unscrewed to relieve the pressure within the container 10 the high pressure gases flowing down through the bore 23 and out through the ports 30 scavenge the interior of the bore 23 so as to remove all accumulated dirt or sediment so that there is no chance of its clogging the small bleeder port 24. This scavenging action is usually sufficient to completely clean out the interior of the blow-off cock device 21. The cap 28 may, however, be removed completely and the interior of the blow-off cock cleaned with a suitable tool or brush. It will thus be seen that although the normal pressure relief operation can be quickly and easily carried out by the finger operated valve 25 that, nevertheless, the small bleeder port 24 is effectively maintained free of dirt or sediment which would otherwise clog it.

I claim as my invention:

1. A solid to gaseous converter for carbon dioxide or the like comprising, in combination, a hermetically sealed container adapted to contain a mass of solid carbon dioxide, said container having an opening therein through which the solid carbon dioxide may be inserted, said opening being bordered by an inwardly facing shoulder, a closure for said opening positioned within said container and bearing against said shoulder whereby the pressure of said gas within said container forces said closure tightly against said shoulder to form a hermetical seal, an aperture located at a low point in said container, a valve body threaded in said aperture and having a bleeder port of very small cross-sectional area therein, a digitally operable valve member controlling the small port for bleeding gas from said container through said small port, the rapid flow of high pressure gas within the container to said bleeder port serving to scrub the container walls free of any oil or the like collected therein, said valve body also having a relatively large clean-out port therein communicating with said small bleeder port and directly with the interior of said container independently of said bleeder port, and a wrench-operable valve member arranged to close said larger port and to open the same for the escape of scavenging gas upon the removal thereof.

2. A solid to gaseous converter for carbon dioxide or the like comprising, in combination, a hermetically sealed container adapted to contain a mass of solid carbon dioxide, said container having an opening therein through which the solid carbon dioxide may be inserted, opening being bordered by an inwardly facing shoulder, a closure for said opening positioned within said container and bearing against said shoulder whereby the pressure of said gas within said container forces said closure tightly against said shoulder to form a hermetic seal, an aperture located at a low point in said container, a generally cylindrical valve body threaded in said aperture and having a central axial bore therein opening into said chamber at the inner end thereof and to the atmosphere at the outer end thereof, said valve body having a small bleeder port in the side wall thereof opening into said bore, a digitally operable valve member for controlling said small port to relieve the pressure in said chamber upon the opening of said valve and thereby permit opening of said closure member, the gas escaping from said container through said port serving to scavenge the interior walls of said container, and a cup shaped cap threaded on the outer end of said valve body for closing outer end of said bore therein, the latter being exposed for cleaning out of any foreign matter blocking said small bleeder port upon removal of said cap.

ROY E. McILRATH.